United States Patent
Ando et al.

(10) Patent No.: US 8,351,607 B2
(45) Date of Patent: Jan. 8, 2013

(54) WIRELESS COMMUNICATION DEVICE, METHOD FOR WIRELESS CONNECTION, AND COMPUTER USABLE MEDIUM THEREFOR

(75) Inventors: Satoko Ando, Aichi (JP); Takanobu Suzuki, Aichi (JP); Takeshi Nagasaki, Aichi (JP); Hideki Nogawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 292 days.

(21) Appl. No.: 12/565,202

(22) Filed: Sep. 23, 2009

(65) Prior Publication Data
US 2010/0082999 A1     Apr. 1, 2010

(30) Foreign Application Priority Data
Sep. 30, 2008   (JP) ................................ 2008-255586

(51) Int. Cl.
*H04K 1/00* (2006.01)
*H04L 9/00* (2006.01)
(52) U.S. Cl. ......... 380/270; 713/168; 713/182; 713/183
(58) Field of Classification Search .................. 713/168, 713/170–171, 182–183; 380/270; 726/1–7
See application file for complete search history.

(56) References Cited

U.S. PATENT DOCUMENTS

| | | | |
|---|---|---|---|
| 5,513,263 A | 4/1996 | White et al. | |
| 5,912,959 A | 6/1999 | Johnson | |
| 6,084,968 A * | 7/2000 | Kennedy et al. | 380/259 |
| 7,058,806 B2 * | 6/2006 | Smeets et al. | 713/166 |
| 7,505,596 B2 | 3/2009 | Duplessis et al. | |
| 2005/0125693 A1 | 6/2005 | Duplessis et al. | |
| 2005/0148326 A1 | 7/2005 | Nogawa et al. | |
| 2006/0106918 A1 | 5/2006 | Evert et al. | |
| 2006/0246946 A1 | 11/2006 | Moritomo et al. | |
| 2007/0192596 A1 | 8/2007 | Otsuka | |
| 2008/0086760 A1 | 4/2008 | Jiang et al. | |
| 2008/0163343 A1 | 7/2008 | Kudo | |
| 2010/0182956 A1 | 7/2010 | Moritomo et al. | |
| 2010/0211777 A1 | 8/2010 | Ishihara | |
| 2010/0329461 A1 | 12/2010 | Duplessis et al. | |

FOREIGN PATENT DOCUMENTS

| | | |
|---|---|---|
| EP | 1657855 A1 | 5/2006 |
| JP | 2004-023365 A | 1/2004 |
| JP | 2004-180010 | 6/2004 |

(Continued)

OTHER PUBLICATIONS

Extended EP Search Report dtd Feb. 22, 2010, EP Appln. 09252275.4.

(Continued)

*Primary Examiner* — Hosuk Song
(74) *Attorney, Agent, or Firm* — Banner & Witcoff, Ltd.

(57) ABSTRACT

A wireless communication device to be wirelessly connected to a wireless network is provided. The wireless communication device includes a password obtainer to obtain a password designated by a user for connecting the wireless communication device to the wireless network, and a wireless connector to connect the wireless communication device to the wireless network with the use of the obtained password. The wireless connector sequentially selects one set from two or more sets, and sequentially attempts to connect the wireless communication device to the wireless network with the use of the sequentially selected one set. Each set of the two or more sets has an authorization method and an encryption method.

18 Claims, 10 Drawing Sheets

FOREIGN PATENT DOCUMENTS

| | | |
|---|---|---|
| JP | 2005-174134 A | 6/2005 |
| JP | 2005176320 A | 6/2005 |
| JP | 2005-346310 A | 12/2005 |
| JP | 2006-141012 | 6/2006 |
| JP | 2006-279848 A | 10/2006 |
| JP | 2006-309458 A | 11/2006 |
| JP | 2007-151195 | 6/2007 |
| JP | 2008-165444 A | 7/2008 |
| WO | 2009/011055 A1 | 1/2009 |

OTHER PUBLICATIONS

Jiang et al., "Encryption as an Effective Tool in Reducing Wireless LAN Vulnerabilities," Information Technology: New Generations, 2008, Fifth Int'l Conf. on, IEEE, Piscataway, NJ, USA, Apr. 7, 2008, pp. 557-562.

Wi-Fi Alliance: "Wi-Fi Certified for Wi-Fi Protected Setup: Easing the User Experience for Home and Small Office Wi-Fi Networks" [Online] 2007, pp. 1-14, XP002567243, retrieved Feb. 2010 from: http://www.wi-fi.org/wp/wifi-protected-setup.

Notification of Reasons for Rejection for Japanese Patent Application No. 2008-255586 mailed Aug. 18, 2010.

JP Office Action dtd Feb. 8, 2011, JP Appln. 2008-255586, English translation.

Notification of Reasons for Rejection for Japanese Application 2008-255591, mailed Aug. 18, 2010.

European Communication/Examination Report dated Mar. 24, 2011 in European Application No. 09 252 274.7-2413.

Notification of Reasons for Rejection for Japanese Patent Application 2008-255591, mailed Feb. 8, 2011.

Notification of First Office Action for Chinese Patent Application No. 200910204044.5, dated May 23, 2012.

Non-Final OA Mar. 21, 2012, U.S. Appl. No. 12/565,265.

EP Search Report dtd Feb. 22, 2012, EP Appln. 09252274.7.

Notification of First Office Action for Chinese Patent Application No. 200910204045.X dated May 23, 2012.

Final Office Action dtd Nov. 2, 2012, U.S. Appl. No. 12/565,265.

* cited by examiner

DURING SSID SEARCH

| INSTALLATION OF WIRELESS SETTINGS |
| --- |
| SEARCHING WIRELESS NETWORKS ··· |

FIG.4A

SELECTION OF SSID

| SELECT A WIRELESS NETWORK |
| --- |
| <MANUAL INPUT> |
| SSID0001 |
| SSID0002 |
| SSID0003                                      ▽ |

FIG.4B

ENTRY OF NETWORK PASSWORD

| ENTER NETWORK PASSWORD |
| --- |
| ENTER A PRESET PASSWORD IF ANY, AND PRESS ENTER KEY.<br>IF NO PASSWORD IS PRESET, LEAVE THE ENTRY FIELD BLANK AND PRESS ENTER KEY.<br><br>ABCDEFG···          ENTER |

FIG.4C

WIRELESS COMMUNICATION DEVICE, METHOD FOR WIRELESS CONNECTION, AND COMPUTER USABLE MEDIUM THEREFOR

CROSS REFERENCE TO RELATED APPLICATION

This application claims priority from Japanese Patent Application No. 2008-255586, filed on Sep. 30, 2008, the entire subject matter of which is incorporated herein by reference.

BACKGROUND

1. Technical Field

The present invention relates to a wireless communication device to be connected to a network and a method to connect the wireless communication device with a network.

2. Related Art

A wireless LAN (local area network) has been widespread and utilized in network computing environment. Hereinafter, the wireless LAN will be referred to as a wireless network. Specifically in the wireless network, security of information exchanged therein is often threatened. Therefore, in many cases, security in the wireless network is enhanced by authorization and encryption; a wireless communication device to be connected to the wireless network is required to be authorized, and information exchanged in the wireless network is encrypted. Methods for authorization include, for example, Shared-key authorization, WPA (Wi-Fi Protected Access)-PSK (Pre-Shared Key), and WPA2-PSK. Alternatively to these methods, the wireless network may operate in "open authorization" method, in which no authorization is required for communication. Methods for encryption include, for example, WEP (Wired Equivalent Privacy), TKIP (Temporal Key Integrity Protocol), and AES (Advanced Encryption Standard). Alternatively to these methods, the wireless network may operate in "no encryption" method, in which no encryption is required for communication.

When a wireless communication device is connected with the wireless network, the wireless communication device is required to have predetermined wireless settings installed. If the wireless network is protected by authorization and/or encryption, the wireless communication device is required to have the settings for the authorization/encryption methods installed.

The settings for authorization and encryption in the wireless network are often complicated and difficult for users to deal with. Therefore, easier methods to connect a wireless communication device with the wireless network have been sought. For example, WPS (Wi-Fi Protected Setup), which is a known technology to install wireless settings fully automatically, is suggested by Wi-Fi Alliance. The full-automatic installation reduces burden on users but requires the wireless communication device to be complied with the methods for automatic settings such as WPS.

SUMMARY

Thus, methods to easily install the settings for wireless communication, which require less burden on users, have yet been sought in the widespread wireless network environment.

In view of the above, the present invention is advantageous in that a wireless communication device, which can be connected to the wireless network easily with reduced burden on users, is provided. Further, a method to connect the wireless communication device to the wireless network easily is provided. Furthermore, a computer readable medium to store computer readable instructions to control the wireless communication device to be connected with the wireless network is provided.

BRIEF DESCRIPTION OF THE ACCOMPANYING DRAWINGS

FIGS. 4A-4C are illustrative views of user interfaces to be presented to a user in the wireless settings installation process according to the first embodiment of the present invention.

Figure 10:
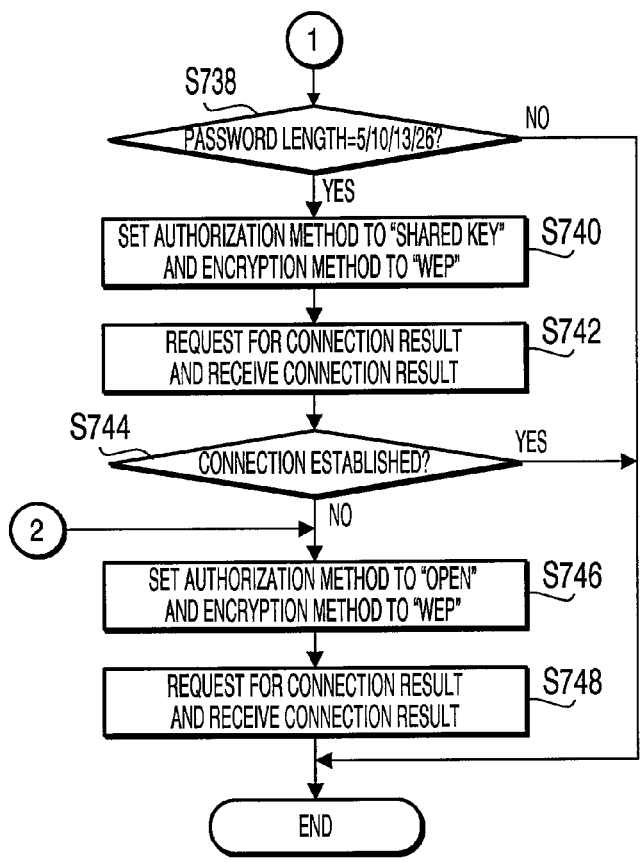

FIG. 10 a flowchart to illustrate the detailed flow of issuing round-robin requests for establishing connection to the MFP 100 according to the third embodiment of the present invention.

Figure 11:
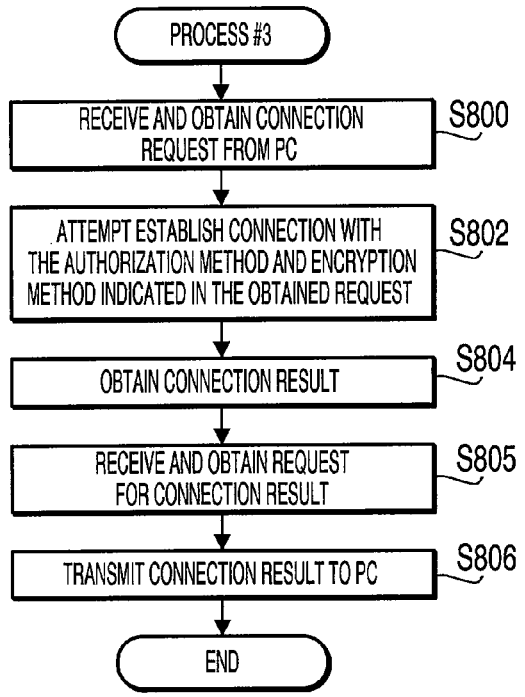

FIG. 11 is a flowchart to illustrate a detailed flow of attempt to establishing connection between the MFP 100 and the external device within the wireless network 10 according to the third embodiment of the present invention.

DETAILED DESCRIPTION

Hereinafter, a first embodiment according to an aspect of the present invention will be described with reference to the accompanying drawings.

Firstly, an overall configuration of a network system including a wireless network 10 according to the embodiment of the present invention will be described. The wireless network 10 includes an access point 300A and an MFP (multifunction peripheral) 100. The MFP 100 is equipped with a plurality of functions to, for example, print, scan, and/or copy images. The MFP 100 is connected to a PC (personal computer) 400 within the wireless network 10 through the access point 300A, a wired LAN 600, and a hub 620. The MFP 100 can receive print data transmitted from the PC 400 to print and transmits image data representing a scanned image to the PC 400.

Figure 2:
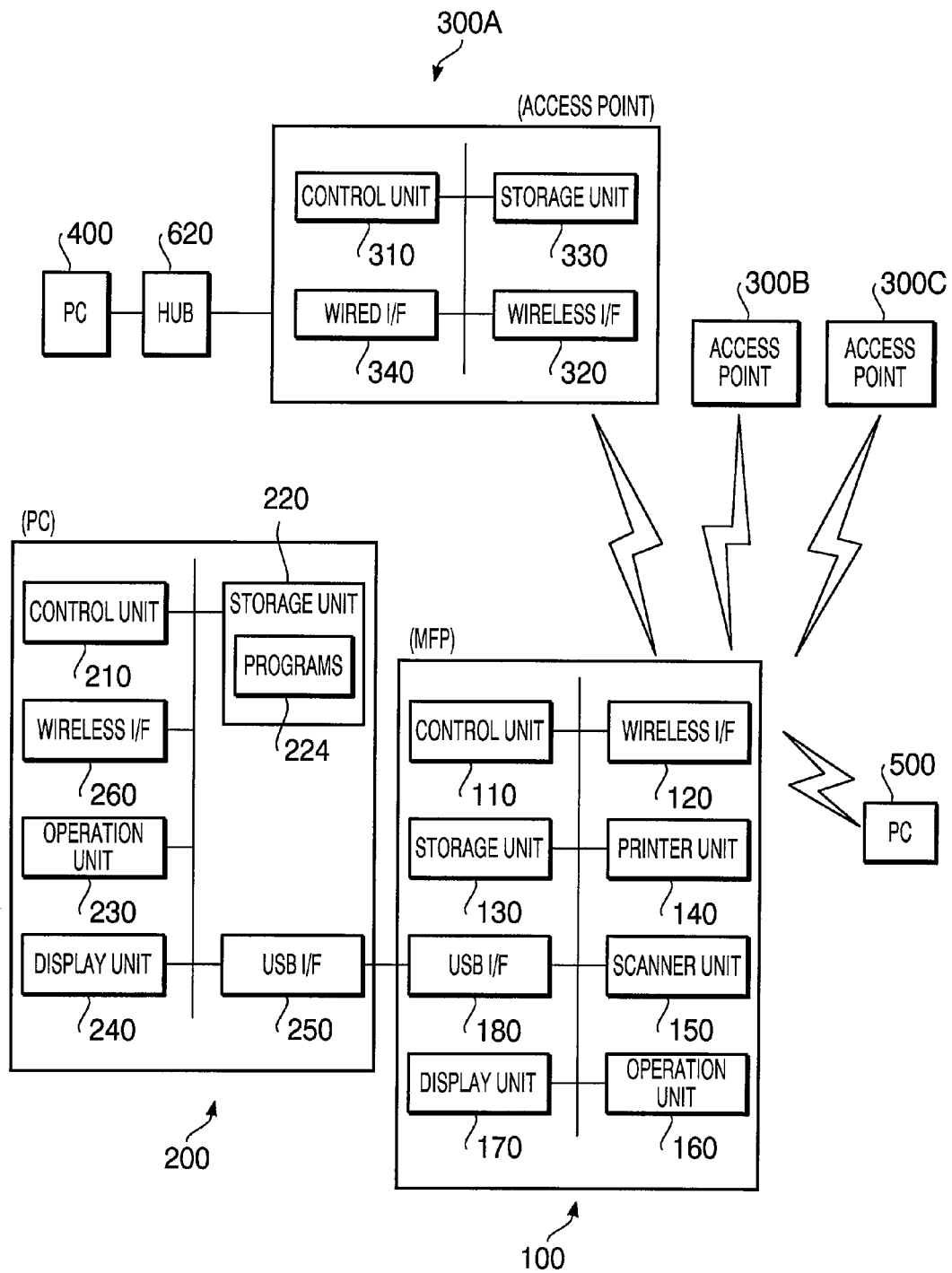
FIG. 2 is a block diagram to illustrate the network system 10 with device components according to the first embodiment of the present invention.

The MFP 100 is further connected with a PC 200 through an USB (universal serial bus) interface (I/F) 180 (see FIG. 2). The PC 200 can process the wireless settings which are to be installed in the MFP 100. The connection between the MFP 100 and the PC 200 is not limited to the USB interfaces 180, 250 (see FIG. 2), but may be achieved through, for example, a wired LAN cable. When the PC 200 is equipped with a wireless interface, for another example, the connection may be achieved through ad-hoc wireless communication.

Figure 1:
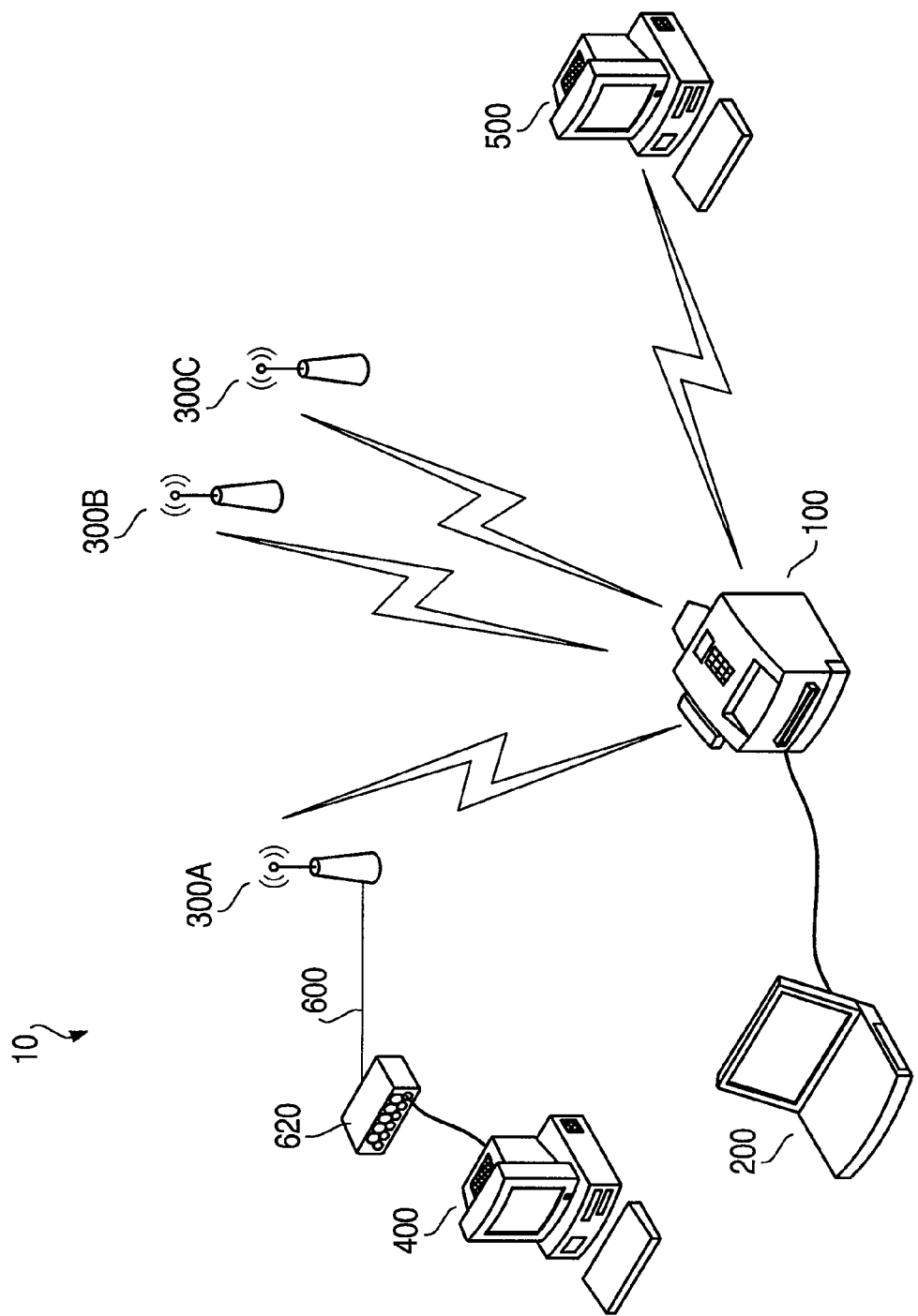
FIG. 1 is a schematic diagram to illustrate a network system 10 according to a first embodiment of the present invention.

The wireless network 10 further has a plurality of access points, including access points 300B and 300C in addition to the access point 300A. Furthermore, a PC 500 having a wireless interface is wirelessly connected with the wireless network 10. In the following description, a communication mode for wireless connection achieved through the access points 300A, 300B, and 300C will be referred to as infrastructure mode. On the other hand, a communication mode for wireless connection achieved by two devices, which communicate with each other directly, will be referred to as ad-hoc mode. In FIG. 1, for example, when the PC 500 and the MFP 100 communicate directly with each other, and when print data transmitted from the PC 500 is received by the MFP 100, the communication mode for the data transmission is ad-hoc mode.

Referring to FIG. 2, the device components in the network system 10 according to the present embodiment will be described. According to the present embodiment, the access points 300B, 300C are configured to have same functionalities as the access point 300A and therefore serve similarly to the access point 300A in the network system. Therefore, detailed description and illustration of the access points 300B, 300C are represented by those of the access point 300A. The PCs 400 and 500 are configured substantially similarly to the PC 200; therefore, description and illustration of the PCs 400 and 500 are represented by those of the PC 200.

The configuration of the MFP 100 will be described. The MFP 100 includes a control unit 110, a wireless interface (I/F) 120, a storage unit 130, a printer unit 140, a scanner unit 150, an operation unit 160, a display unit 170, and a USB interface 180. The control unit 110 controls behaviors of the MFP 100 itself. The control unit 110 includes, for example, a CPU being an arithmetic processor, a ROM to store various programs to manipulate the MFP 100, and a RAM being a workspace for the processor. When the CPU runs a program stored in the ROM, operations to manipulate the MFP 100 are performed. In this regard, various data, for example, data exchanged with an external device through the wireless interface 120 and entered through the operation unit 160, is stored in the RAM. The stored data is processed by the CPU which accesses the RAM. The CPU develops the programs stored in the ROM in the RAM to run so that the MFP 100 is controlled to provide its functions to the user.

The wireless interface 120 in the MFP 100 is an interface to connect the MFP 100 to, for example, the access point 300A wirelessly in the infrastructure mode and to the PC 500 wirelessly in the ad-hoc mode. The storage unit 130 is a data storage to store information concerning wireless communication settings of the MFP 100 and may be a non-volatile storage (e.g., an EEPROM) and a hard disk. The printer unit 140 prints an image according to image data, for example, transmitted from the PC 400 or entered through the scanner unit 150. The scanner unit 150 scans an image formed on an original document which is placed on a document holder (not shown). The operation unit 160 provides an interface for data input to a user and includes, for example, input keys such as direction keys, numerical keys, an enter key, and a cancel key.

The display unit 170 displays various information concerning operations in the MFP 100. The USB interface (I/F) 180 provides an interface to other USB-enabled devices to be connected with the MFP 100.

The MFP 100 according to the present embodiment is configured to support a plurality of authorization methods, which are open authorization, shared-key authorization, WPA-PSK, and WPA2-PSK, and a plurality of encryption methods, which are WEP, TKIP, and AES. The MFP 100 is also capable of communicating with an external device without encryption.

Table 1 provided below indicates correspondence of the available authorization method with the encryption methods, allowable lengths of passwords, and supporting wireless communication modes.

TABLE 1

| Authorization Method | Encryption Method | | Length of Password (available character count) | Communication Mode |
|---|---|---|---|---|
| WPA2-PSK | AES | TKIP | 8 ≦ character count ≦ 63 | infrastructure |
| WPA-PSK | AES | TKIP | 8 ≦ character count ≦ 63 | infrastructure |
| Shared-Key | WEP | | 5/10/13/26 | infrastructure |
| Open | WEP | none | Open/WEP: 5/10/13/26 Open/none: 0 | infrastructure/ ad-hoc |

In Table 1, a lowermost line indicates available encryption methods, allowable lengths of password, and supporting communication modes in open authorization method and when the communication is provided without authorization. Indication "none" in the right half section in the encryption column of the lowermost line refers to that no encryption is required or that encryption is invalidated. In the third line, the allowable length of a password for Shared-key authorization and WEP encryption may be, in addition to 5, 10, 13, and 26 as indicated in Table 1, 16 or 32. However, description for those cases, in which passwords including 16 or 32 characters are used, will be omitted. The infrastructure mode can be employed in any of the authorization methods listed in Table 1, whilst the ad-hoc mode can be employed in the case when no authorization method is required. In the following description, the authorization methods "WPA-PSK" and "WPA2-PSK" will be also referred to as "WPA" and "WPA2" respectively.

The configuration of the PC 200 will be described. The PC 200 is a known personal computer and includes a control unit 210, a storage unit 220, an operation unit 230, a display unit 240, a USB interface 250, and a wireless interface (I/F) 260. The control unit 210 includes, for example, a CPU, a ROM, and a RAM and controls behaviors of the PC 200 itself. The storage unit 220 is a data storage to store programs 224 which are run to install the wireless settings of the PC 200. The storage unit 220 may be, for example, a hard disk. The CPU in the control unit 210 processes data, which is entered through the USB interface 250 and the operation unit 230, stored in the ROM, and develops the programs 224 stored in the storage unit 220 in the RAM to run, the PC 200 is controlled to provide its functions to the user.

The operation unit 230 provides an input interface to the user entering instructions for running the programs 224 to the PC 200. The operation unit 230 includes, for example, a keyboard and a mouse. The display unit 240 displays information concerning operations performed in the PC 200. The USB interface 250 provides an interface to connect the PC 200 to USB-enabled external devices. Further, The PC 200 includes the wireless interface 260, which provides an interface to connect the PC 200 with external devices wirelessly in the infrastructure mode or in ad-hoc mode.

The configuration of the access point 300A will be described. The access point 300A is a known access point and includes a control unit 310, a wireless interface (I/F) 320, a storage unit 330, and a wired interface (I/F) 340. The control unit 310 includes a CPU, a ROM, and a RAM and controls behaviors of the access point 300A. The wireless interface 320 provides an interface to external devices to be wirelessly connected with the access point 300A. Data to be exchanged with the external devices is transmitted and received through the wireless interface 320. The storage unit 330 is a data storage to store information concerning wireless communication settings of the access point 300A. The information to be stored includes an SSID (Service Set Identifier) being an identifier to identify the wireless network, a valid authentication method, an encryption method, and a password for the network. The storage unit 330 may be, for example, an EEPROM. The wired interface 340 is an interface to connect the access point 300A with wired LAN 600.

Hereinafter, three embodiments of processes concerning installation of the wireless settings in the MFP 100 will be described. Wireless connection between the access point 300A and the MFP 100 is established when any of these processes completes. Thereafter, the MFP 100 is allowed to communicate with the PC 400 to receive, for example, print data transmitted from the PC 400 to print and transmit image data scanned by the scanner unit 150 of the MFP 100 to the PC 400.

Figure 3:
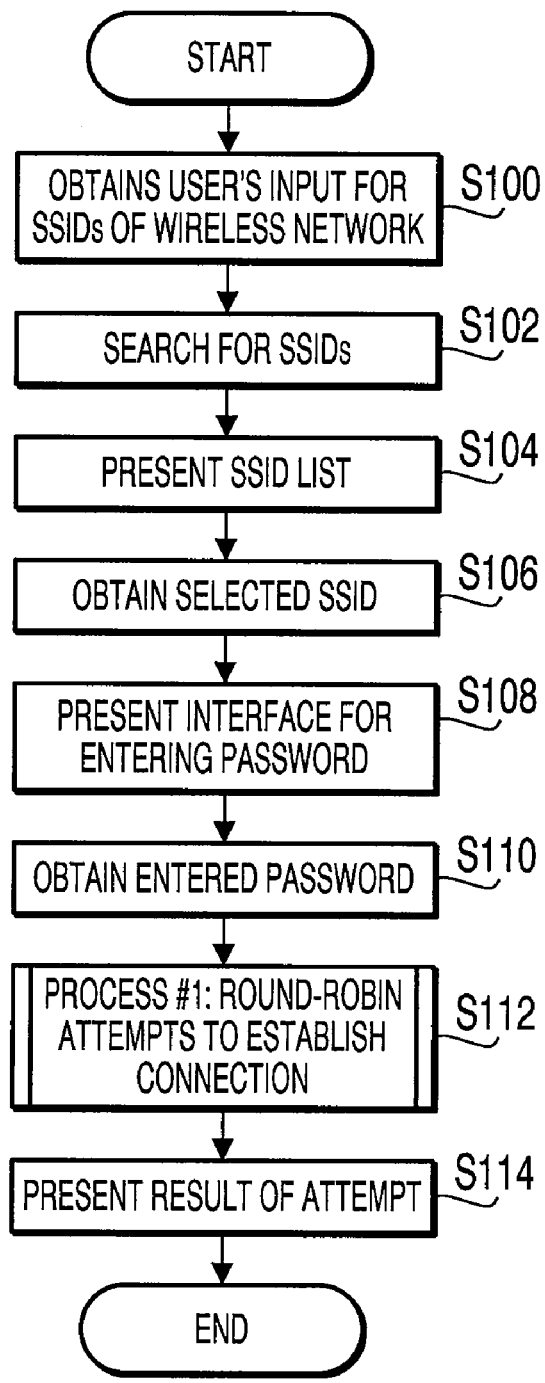
FIG. 3 is a flowchart to illustrate a wireless settings installation process according to the first embodiment of the present invention.

A first embodiment of a wireless settings installation process to be executed in the MFP 100 will be described with reference to FIG. 3. When a user enters an instruction to start the process through the operation unit 160, the control unit 110 detects the instruction and starts the process. In particular, when the user enters the instruction in the MFP 100 through the operation unit 160 to search for wireless networks, in S100, the control unit 110 obtains the instruction. Thereafter, in S102, the control unit 110 manipulates the wireless interface 120 to search for external devices (e.g., the access points 300A-300C and the PC 500) which are provided in the vicinity of the MFP 100 within the wireless networks. In particular, in S102, the control unit 110 receives SSIDs which are provided from the external devices. During the search, the control unit displays status (see FIG. 4A) indicating that the MFP 100 is in progress to detect the wireless networks in the display unit 170 of the MFP 100. When the control unit 110 collects the SSIDs received through the wireless interface 120, in S104, the control unit 110 presents a list including the collected SSIDs to the user through the display unit 170 (see FIG. 4B). The user is prompted to select one of the SSIDs of a wireless network, to which the MFP 100 should be connected. The control unit 110 waits until the user selects one of the SSIDs. In this regard, the user may directly enter an SSID to which the MFP 100 should be connected.

When the user's selection is entered through the operation unit 160, in S106, the control unit 110 obtains the selected SSID. Thereafter, in S108, the control unit 110 displays a user interface (see FIG. 4C) to prompt the user to enter a password in the display unit 170. The password is a predetermined character string which allows the communication devices to be connected with the wireless network. When communication in the wireless network identified by the selected SSID is not encrypted, the user is not specifically required to enter a password. The user is prompted to merely enter confirmation through the operation unit 160 without entering any character. According to the present embodiment, a message to prompt the user to confirm the entry is displayed. In the present embodiment, as shown in FIG. 4C, the password "ABC-DEFG" is entered.

When the user enters the password through the operation unit 160, in 110, the control unit 110 obtains the entered password. When the user did not enter any password in S108, in S110, information indicating no entry of password is obtained. In this regard, a character count for a password is zero (0). According to the present embodiment, thus, the user interface to prompt the user to enter the password is displayed regardless of presence or absence of an encryption method employed in the wireless network, and a password entered by the user through the user interface is obtained regardless of its character count even when the character count is zero.

Thereafter, in S112, the control unit 110 attempts to establish connection with an external device included in the wireless network, which is represented by the selected SSID, according to the authorization methods and the encryption methods supported by the MFP 100. A detailed behavior of the control unit 110 in S112 to establish connection will be described later.

In S114, result of the attempts is presented to the user through the display unit 170. That is, when connection between the MFP 100 and the external device is established, the successful establishment is indicated to the user through the display unit 170. When attempts to establish connection with the external device fail, the failure of the attempts is indicated to the user through the display unit 170. Meanwhile, the control unit 110 repeats S112 and the succeeding steps in a background operation. When the attempts to establish connection continue to fail, the flow may be terminated. Additionally or alternatively, presentation of the message indicating the attempted result of the connection establishment through the display unit 170 in S114 may be replaced with presenting the message on a sheet of paper by manipulating the printer unit 140 (i.e., printing the message on the recording sheet to present to the user).

Figure 5:
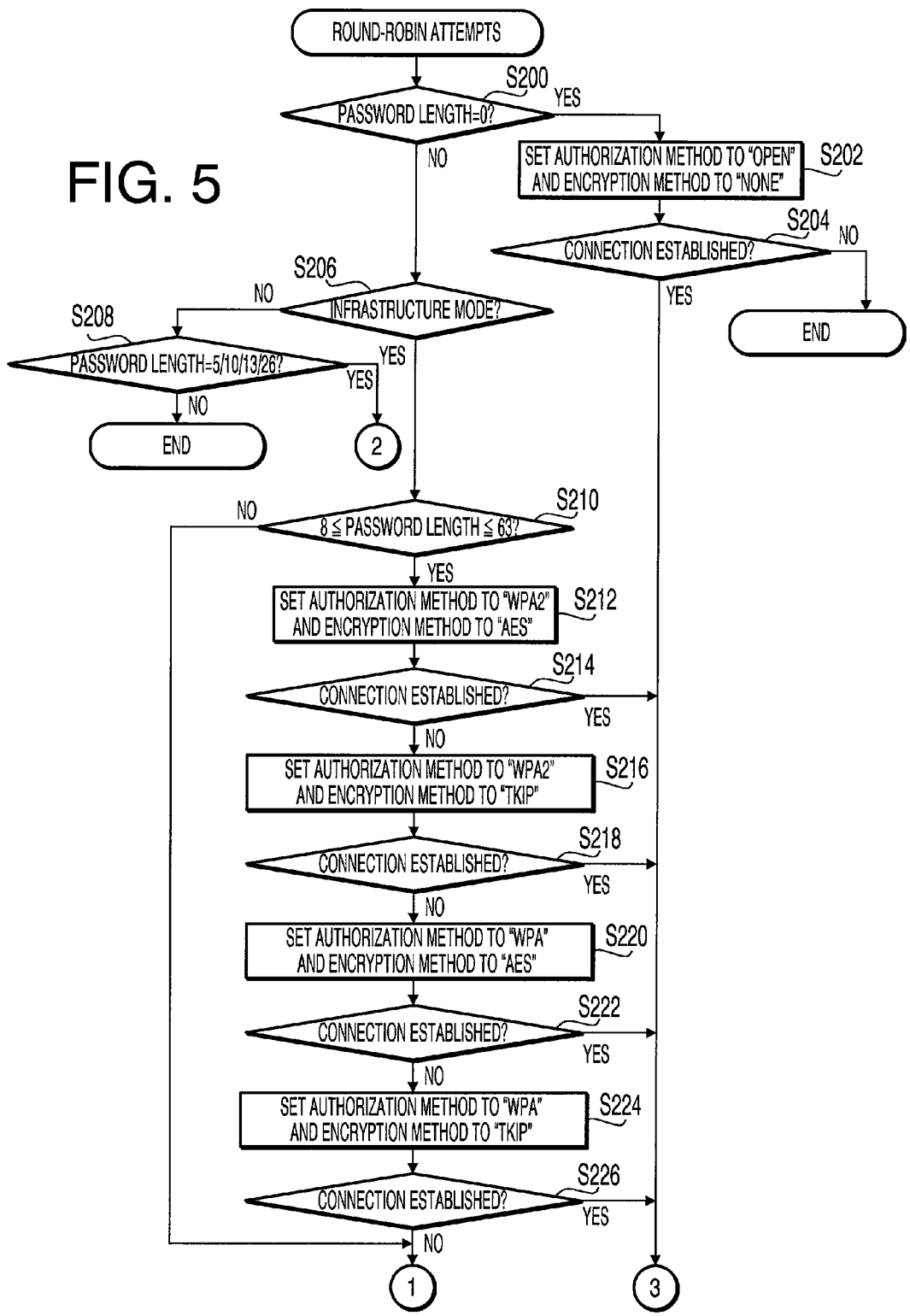
FIG. 5 is a flowchart to illustrate a detailed flow of round-robin attempts to establish connection between an MFP (multifunction peripheral) 100 and an external device within the network system 10 according to the first embodiment of the present invention.

Next, a detailed flow of behaviors of the control unit 110 of the MFP 100 in S112 mentioned above will be described with reference to FIGS. 5 and 6. In this flow, the control unit 110 attempts to establish connection with the external device in the wireless network, which is identified by the selected SSID, according to the authorization methods and the encryption methods supported in the MFP 100. Specifically, the control unit 110 attempts to establish connection with the external device in each set of the authorization method and the encryption method, which are indicated in Table 1. The flow in S112 will be also referred to as Process #1.

When the flow in Process #1 starts, in S200, the control unit 110 examines as to whether a character count of the password obtained in S110 is zero. The character count of the password is zero when the user enters no password but confirms absence of the password through the operation unit 160 in S110 (see FIG. 3). When the character count is zero (S200: YES), the control unit 110 adopts a set of the authorization method being "open" and the encryption method being "none." In S202, the control unit 110 attempts to establish connection with the external device according to the authorization method "open" and the encryption method "none" and the SSID obtained in S106. In S204, it is examined as to whether the connection is established. When the connection is established (S204: YES), the flow proceeds to S238. When the attempt to establish connection fails (S204: NO), the flow repeats to attempt establishing connection with the external device in the same wireless settings for a predetermined number of times. When all the attempts fail (S204: NO), the control unit 110 terminates the flow. When connection is established during the repeated attempts (S204: YES), the flow proceeds to S238.

Figure 6:
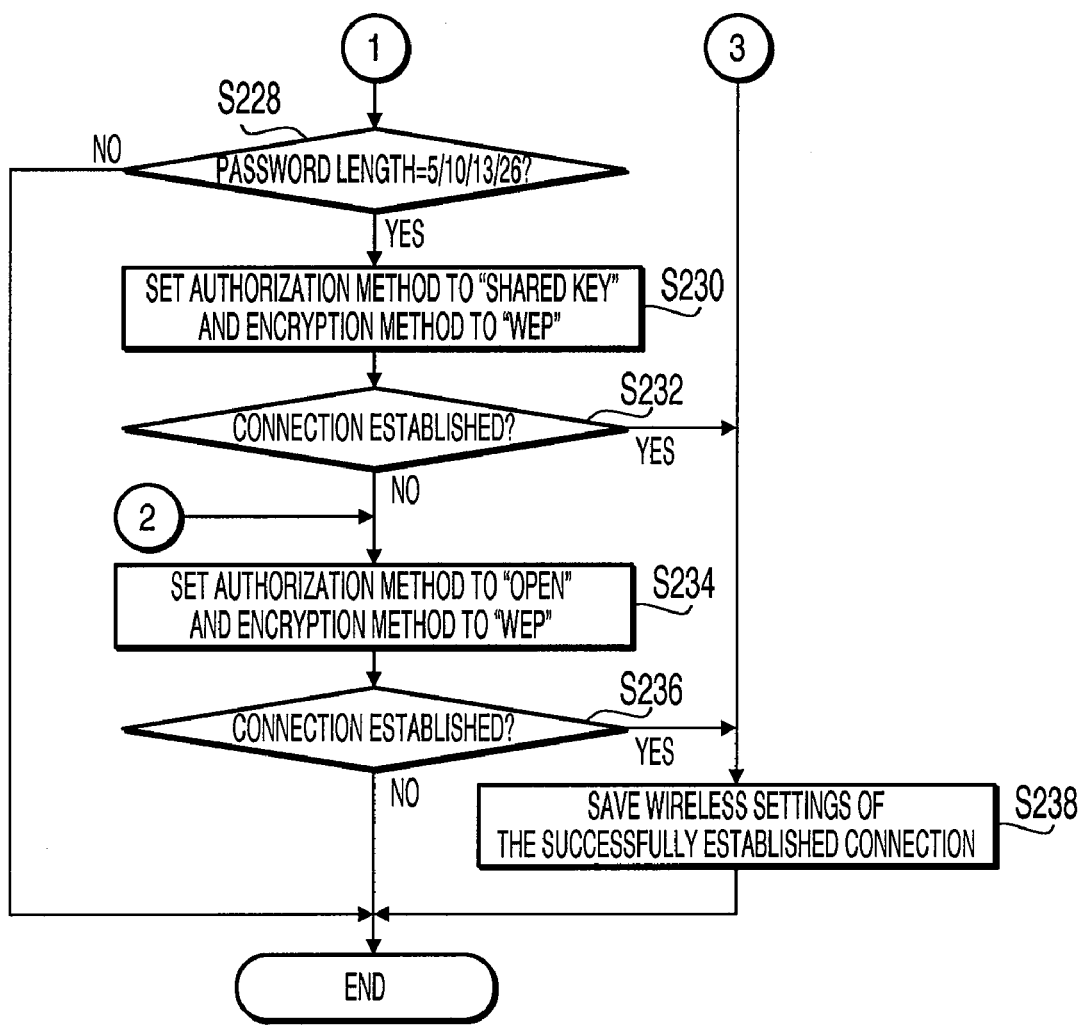
FIG. 6 is a flowchart to illustrate the detailed flow of round-robin attempts to establish connection between the MFP 100 and the external device within the network system 10 according to the first embodiment of the present invention.

In S200, when the character count is other than zero (S200: NO), in S206, the control unit 110 examines as to whether the wireless network represented by the SSID, which was obtained in S106, operates in the infrastructure mode. In this step, the control unit 110 specifically examines information appended to the SSID, which was obtained from the external device in S102 through the wireless interface 120. The appended information indicates the communication mode of the wireless network, which is one of the infrastructure mode and the ad-hoc mode. When the control unit 110 determines that the communication mode is not the infrastructure mode but the ad-hoc mode (S200: NO), in S208, the control unit 110 examines as to whether the character count of the password is any of 5, 10, 13, and 26. If the character count is none of 5, 10, 13, or 26 (S208: NO), the control unit 110 terminates Process #1. When the character count is any of 5, 10, 13, and 26 (S208: YES), the flow proceeds to S234 (FIG. 6). According to the present embodiment, sets of an authorization method and an encryption method adoptable to the wireless network operating in the ad-hoc mode are: "open and WEP" and "open and none." Further, acceptable character counts for a password for the set "open and WEP" are 5, 10, 13, and 26 (see Table 1). (When the set of authorization method and encryption method is "open and none," an acceptable character count is zero.) According to the communication system 10 shown in FIG. 1, when an SSID provided by the PC 500 is selected in S110, the wireless network identified by the SSID is determined to operate in the ad-hoc mode (S206: NO). When an SSID provided by one of the access points 300A-300C is selected, the wireless network identified by the SSID is determined to operate in the infrastructure mode (S206: YES).

When the communication mode is the infrastructure mode (S206: YES), the flow proceeds to S210. In S210, the control unit 110 examines as to whether the character count of the password, which was obtained in S110 (FIG. 3), is greater than or equal to 8, or smaller than or equal to 63. For example, when the password includes 5 characters (S210: NO), sets of "WPA2 and AES," "WPA2 and TKIP," "WPA and AES" and "WPA and TKIP" are omitted from the wireless settings in which the control unit 110 should attempt to establish connection. In other words, when 5 characters are included in the password, the flow proceeds to S228 (FIG. 6), and the control unit attempts to establish connection with the external device in the wireless settings of sets: "Shared-key and WEP" and "open and WEP."

In S210, if the control unit 110 determines that the character count of the password is greater than or equal to 8, or smaller than or equal to 63 (S210: YES), in 5212, the control unit 110 adopts the set "WPA2 and AES" for the authorization method and the encryption method to be the wireless settings, in which the control unit 110 will attempt to establish connection with the external device. In S212, further, the control unit 110 attempts to establish connection with the external device according to the wireless settings, which are the authorization method (i.e., WPA2) and the encryption method (i.e., AES), the SSID obtained in S106, and the password obtained in S110. In S214, it is examined as to whether the connection is established. When the attempt to establish connection fails (S214: NO), in S216, the control unit 110 adopts the next set of the authorization method and the encryption method: "WPA2 and TKIP." In S216, the control unit 110 attempts to establish connection with the external device according to the wireless settings, which are the authorization method (i.e., WPA2) and the encryption method (i.e., TKIP), the SSID obtained in S106, and the password obtained in S110. In S218, it is examined as to whether the connection is established. When the attempt to establish connection fails (S218: NO), in S220, the control unit 110 adopts the next set of the authorization method and the encryption method: "WPA and AES." In S220, the control unit 110 attempts to establish connection with the external device according to the wireless settings, which are the authorization method (i.e., WPA) and the encryption method (i.e., AES), the SSID obtained in S106, and the password obtained in S110. In S222, it is examined as to whether the connection is established. When the attempt to establish connection fails (S222: NO), in S224, the control unit 110 adopts the next set of the authorization method and the encryption method: "WPA and TKIP" and attempts to establish connection with the external device according to the wireless settings, which are the authorization method (i.e., WPA) and the encryption method (i.e., TKIP), the SSID obtained in S106, and the password obtained in S110. In S226, it is examined as to whether the connection is established. When the attempt to establish connection fails (S226: NO), the flow proceeds to S228 (see FIG. 6). In the above flow, if connection is established in any of S214 (S214: YES), S218 (S218: YES), S222 (S222: YES), and S226 (S226: YES), the flow proceeds to S238 (see FIG. 6).

In S228, the control unit 110 examines the character count of the password to determine as to whether the character count of the password is any of 5, 10, 13, and 26, similarly to the examination in S208. If the character count is none of 5, 10, 13, or 26 (S228: NO), the control unit 110 terminates Process #1. When the character count is any of 5, 10, 13, and 26 (S228: YES), the flow proceeds to S230. In S230, the control unit 110 adopts the next set of the authorization method and the encryption method: "Shared-key and WEP." In S230, the control unit 110 attempts to establish connection with the external device according to wireless settings, which are the authorization method (i.e., Shared-key) and the encryption method (i.e., WEP), the SSID obtained in S106, and the password obtained in S112. In S232, it is examined as to whether the connection is established. When the attempt to establish connection fails (S232: NO), in S234, the control unit 110 adopts the next set of the authorization method and the encryption method: "open and WEP." In S234, the control unit 110 attempts to establish connection with the external device according to wireless settings, which are the authorization method (i.e., open) and the encryption method (i.e., WEP), the SSID obtained in S106, and the password obtained in S110. In S236, it is examined as to whether the connection is established. When the attempt to establish connection fails (S236: NO), the control unit 110 terminates Process #1. If connection is established in either of S232 (S232: YES) and S236 (S236: YES), the flow proceeds to S238. In S236, if the attempt to establish connection fails (S236: NO), the control unit 110 terminates Process #1. In the background operation, however, the control unit 110 repeats S212-S238. If connection is established during the background attempts (S214: YES, S218: YES, S222: YES, S226: YES, S232: YES, or S236: YES), the flow proceeds to S238, and the control unit 110 presents the successful establishment to the user through the display unit 170 in S114 (FIG. 3).

In S238, the control unit 110 saves the wireless settings of the authorization method and the encryption method, the SSID, and the password, in which the control unit 110 was successful to establish connection with the external device, in the storage unit 130 and terminates Process #1. The information indicating the communication mode (i.e., the infrastructure mode or the ad-hoc mode) of the wireless network is also saved.

According to the above flows, the control unit 110 of the MFP 100 can attempt to establish connection with the external device in the wireless network, which is selected by the user, based on different sets of wireless settings (i.e., the authorization methods and the encryption methods supported in the MFP 100 itself), the SSID representing the wireless network, and the password entered by the user. Specifically, the different sets of the authorization method and the encryption method are attempted successively in a predetermined order so that the wireless settings in which the control unit 110 successfully established connection with the external devices are saved in the storage unit 130 (see S238). Therefore, the MFP 100 can be connected in the wireless network whilst the user is not required to specify the correct set of the authorization method and the encryption method employed in the wireless network.

When the control unit 110 fails to establish connection with the external device in S112, Process #1 in S112 is repeated in the background operation so that establishment of connection with the external device can be retried. Thus, the connection may be established in the second or later attempt. Therefore, even when establishment of connection fails in the first attempt due to an accidental cause, the cause may be resolved whilst the attempts are repeated, and the connection may be established in the second or later attempt.

Figure 7:
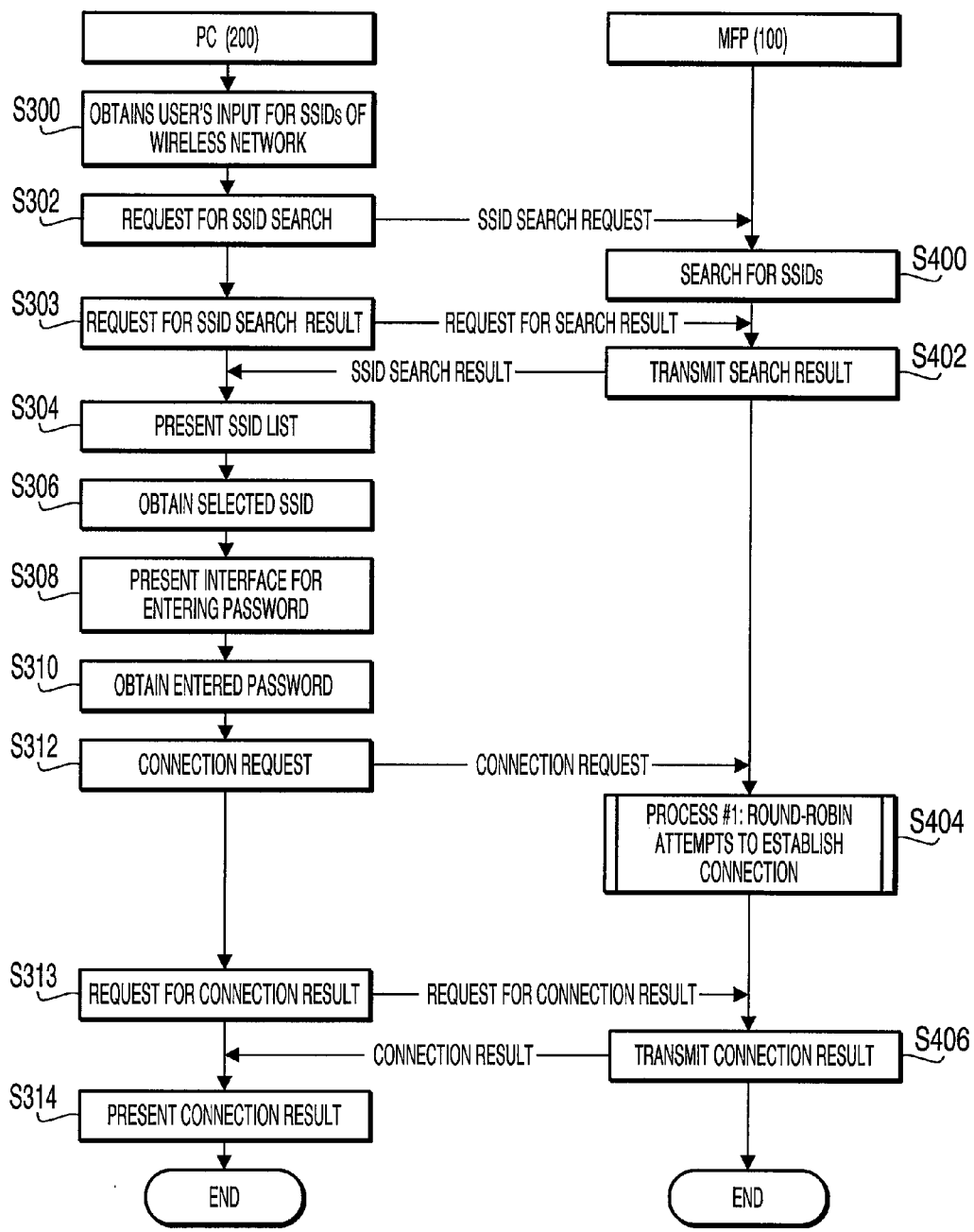
FIG. 7 is a flowchart to illustrate the wireless settings installation process according to a second embodiment of the present invention.

Next, a second embodiment of the wireless settings installation process to be executed in the MFP 100 and the PC 200 will be described with reference to FIG. 7. The second embodiment of the wireless settings installation process is carried out in cooperation of the MFP 100 and the PC 200 connected to the MFP 100 via the USB interfaces 180, 250. In particular, the MFP 100 installs the wireless settings in the MFP 100 itself according to instructions provided by the PC 200.

When the user enters an instruction to start the process through the operation unit 230 of the PC 200, the control unit 210 of the PC 200 detects the instruction and activates a program 224 stored in the storage unit 220. Further, the control unit 210 presents predetermined information to the user through the display unit 240. When the user enters an instruction in the PC 200 through the operation unit 230 to search for wireless networks, in S300, the control unit 210 obtains the instruction. Thereafter, in S302, the control unit 210 manipulates the USB interface 250 to transmit a request to search for SSIDs representing available wireless networks to the MFP 100. After transmitting the search request, and until a searched result is received in the PC 200, the control unit 210 displays status (see FIG. 4A) indicating that the search is in progress in the display unit 240 of the PC 200.

Meanwhile, the control unit 110 of the MFP 100 manipulates the USB interface 180 to receive the search request for SSIDs transmitted from the PC 200. Thereafter, in S400, the control unit 110 controls the wireless interface 120 and searches for available external devices (i.e., the access points 300A-300C and the PC 500). The external devices are detected when the SSIDs output from the external devices are received through the wireless interface 120.

The control unit 210 of the PC 200 waits for the SSID search result to be transmitted from the MFP 100. After a predetermined length of period, in S303, the control unit 210 transmits a request for the SSID search result to the MFP 100. In S402, the control unit 110 of the MFP 100 receiving the request for SSID search result controls the USB interface 180 to transmit the collected search result to the PC 200.

In S304, the control unit 210 of the PC 200 controls the USB interface 250 to receive the search result with the appended information. Further, in S304, the control unit 210 presents a list including the collected SSIDs to the user through the display unit 240 (see FIG. 4B). The user is prompted to select one of the SSIDs of a wireless network, to which the MFP 100 should be connected. The control unit 210 waits until the user selects one of the SSIDs. In this regard, the user may directly enter an SSID to which the MFP 100 should be connected.

When the user's selection is entered through the operation unit 230, in S306, the control unit 210 obtains the selected SSID. Thereafter, in S306, the control unit 210 displays a user interface (see FIG. 4C) to prompt the user to enter a password in the display unit 240. When communication in the wireless network identified by the selected SSID is not encrypted, the user is not specifically required to enter a password. The user is prompted to merely enter confirmation through the operation unit 230 without entering any character. According to the present embodiment, a message to prompt the user to confirm the entry is displayed.

When the user enters the password through the operation unit 230, in 310, the control unit 210 obtains the entered password. When the user did not enter any password in S308, in S310, information indicating no entry of password is obtained. In this regard, a character count for a password is zero (0). Thereafter, in S312, the control unit 210 manipulates the USB interface 250 to transmit a request to attempt establishing connection with the wireless network identified by the SSID obtained in S306 to the MFP 100.

The control unit 110 of the MFP 100 manipulates the USB interface 180 to receive the connection request. Thereafter, in S404, the control unit 110 attempts to establish connection with an external device included in the wireless network, which is represented by the selected SSID, according the authorization methods and the encryption methods supported in the MFP 100 in the round-robin attempts. The round-robin attempts to establish connection with the external device in S404 is identical to Process #1 in S112 in the wireless settings installation process according to the first embodiment and shown in FIG. 3 and FIGS. 5-6; therefore, description of S404 is omitted.

The control unit 210 of the PC 200 waits for a predetermined length of period after the transmission of the connection request to the MFP 100. After the predetermined length of period, in S313, the control unit 210 transmits a request for result of the attempts to establish connection with the external device to the MFP 100. In S406, the control unit 110 of the MFP 100 receiving the request for result of the attempts controls the USB interface 180 to transmit the result of the attempts to the PC 200. The control unit 210 of the PC 200 receives the result in S314 and presents the result to the user through the display unit 240. The flow ends thereafter.

In the above flow, the connection request transmitted from the PC 200 in S312 to the MFP 100 includes the SSID representing the wireless network to which the MFP 100 should be connected. However, the SSID may not necessarily be included in the connection request. For example, when the SSIDs are provided to the PC 200 in S402, the MFP 100 may append identifying information which represents the SSIDs respectively to the SSIDs so that the PC 200 include the identifying information corresponding to the selected SSID in the connection request in place of the SSID. The control unit 110 of the MFP 100 can identify the SSID based on the identifying information and attempt to establish connection with the external device represented by the SSID.

According to the above flow, specifically, the user can input selection of the SSID or directly enter the preferred SSID in S304 through the operation unit 230 of the PC 200, which has improved operability. Further, the password is entered through the operation unit 230 of the PC 200. It is to be noted that operability of the operation unit 230 of the PC 200 is generally better than operability of the operation unit 160 of the MFP 100. Therefore, the user's selection of the SSID and the password can be easily entered in the PC 200. Further, the collected SSIDs and the result of the attempts to establish connection are presented to the user through the display unit 240 of the PC 200, which has better visibility, in S314.

Next, a third embodiment of the wireless settings installation process to be executed in the MFP 100 and the PC 200 will be described with reference to FIGS. 8-11. The third embodiment of the wireless settings installation process is carried out in cooperation of the MFP 100 and the PC 200 connected to the MFP 100 via the USB interfaces 180, 250. In particular, the MFP 100 installs the wireless settings in the MFP 100 itself according to instructions provided by the PC 200. However, the round-robin adoptions in S404 carried out in the MFP 100 in the second embodiment are mainly carried out by the PC 200. The MFP 100 attempts to establish connection based on instructions from the PC 200 and transmits result of the attempt to the PC 200 on the basis of the attempt.

Figure 8:
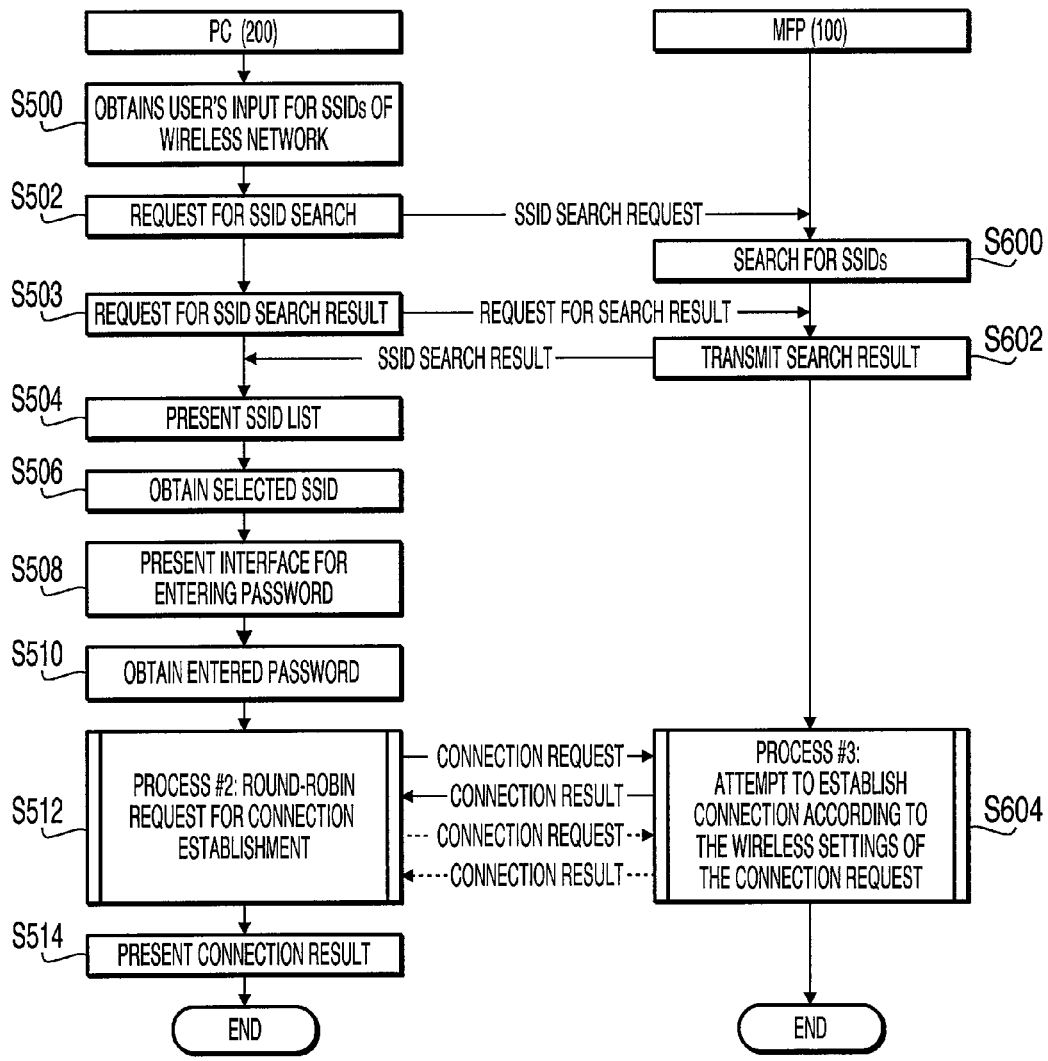
FIG. 8 is a flowchart to illustrate the wireless settings installation process according to a third embodiment of the present invention.

FIG. 8 is a flowchart to illustrate the wireless settings installation process according to the third embodiment of the present invention. The steps S500-S510 are identical with the steps S300-S310 in the wireless settings installation process according to the second embodiment and shown in FIG. 7; therefore, description of those is omitted. Further, the steps S600 and S602 are identical with the steps S400 and S402 in the wireless settings installation process according to the second embodiment and shown in FIG. 7; therefore, description of those is omitted.

In S512, the control unit 210 of the PC 200 receiving the password, which was entered in S510 by the user through the operation unit 230, manipulates the USB interface 250 to transmit connection requests to the MFP 100 and requests the MFP 100 to attempt establish connection with the external device in the wireless network represented by the SSID, which was obtained in S506. In this step, the control unit 210 requests the MFP 100 to attempt establishing connection with the external device according to the respective sets of the wireless settings, i.e., the authorization method and the encryption method, the SSID obtained in S506, and the password obtained in S510. Detailed behavior of the control unit 210 in S512 will be described later.

The control unit 110 of the MFP 100 receiving the connection request performs a process to attempt establishing connection with the external device in S604, i.e., Process #3, which will be described later in detail. The control unit 110 manipulates the USB interface 180 to transmit result of the attempt in Process #3 in S604 to the PC 200. When the result of attempts is received by the control unit 210 of the PC 200 in S512, the flow proceeds to S514. In S514, the control unit 210 of the PC 200 presents the result to the user through the display unit 240. The flow ends thereafter.

Figure 9:
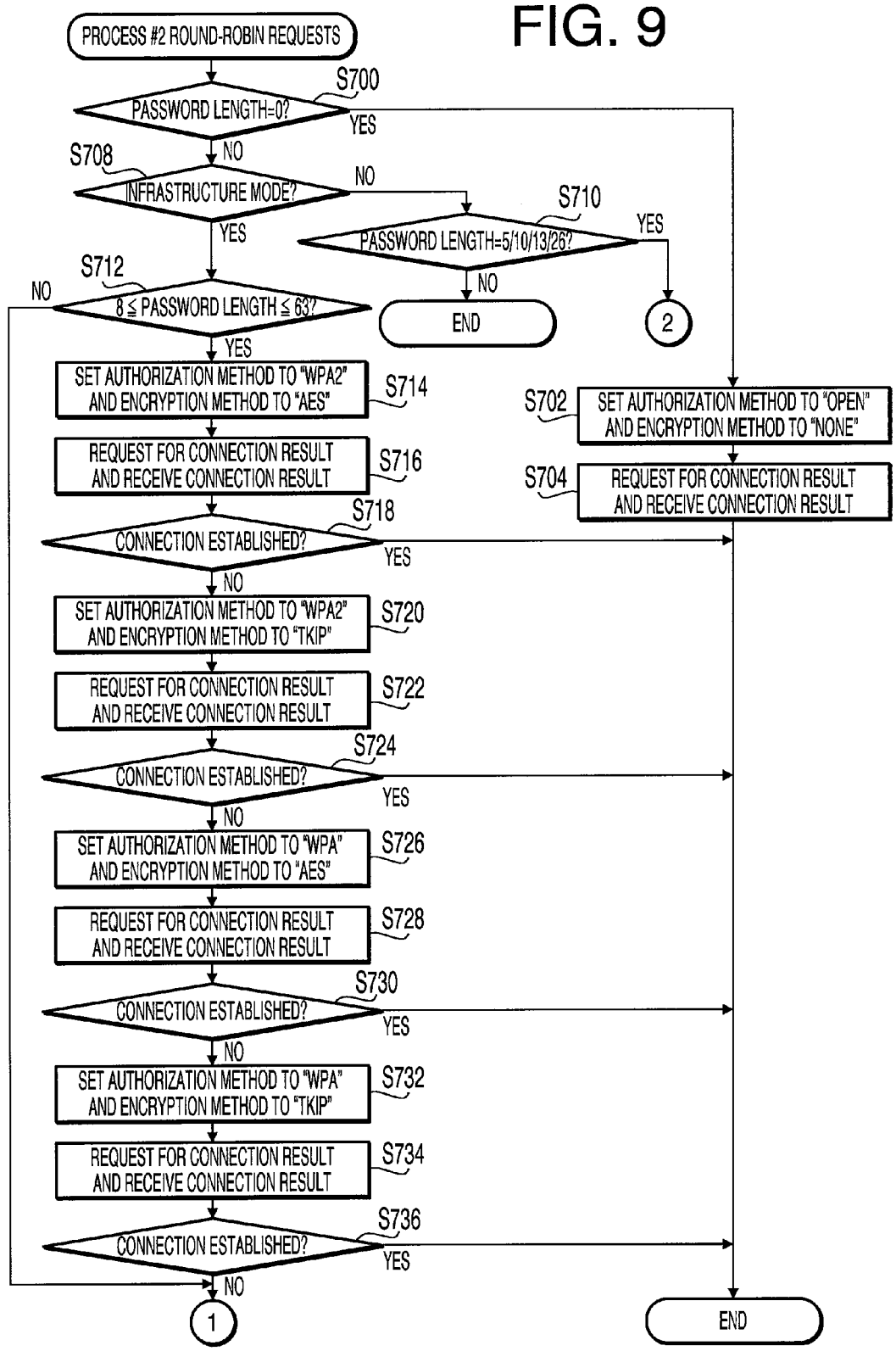
FIG. 9 is a flowchart to illustrate a detailed flow of issuing round-robin requests for establishing connection to the MFP 100 according to the third embodiment of the present invention.

The detailed behaviors of the control unit 210 of the PC 200 in S512 will be described with reference to FIGS. 9 and 10. The flow of behaviors in S512 will be also referred to as Process #2 in the present embodiment. When the flow starts, in S700, the control unit 210 examines as to whether a character count of the password obtained in S510 is zero (0). According to the present embodiment, a character count being zero indicates that the user confirmed absence of a password in S508. Therefore, when the character count of the password is zero (S700: YES), in S702, the control unit 210 adopts a set of the authorization method being "open" and the encryption method being "none." Further, the control unit 210 transmits a connection request to the MFP 100 through the USB interface 250 so that the MFP 100 should attempt to establish connection with the external device in the wireless network, which is represented by the SSID obtained in S506, in the wireless settings (i.e., the authorization method: "open" and the encryption method: "none.") The MFP 100 receiving the connection request performs a process to attempt establishing connection with the external device in S604, which will be described later in detail. In S704, the control unit 210 transmits a request for result of the attempt to the MFP 100 and receives the result. The flow in Process #2 ends thereafter. If the result received in S704 indicates failure of the attempt to establish connection with the external device, the control unit 210 repeats the flow in S702-S704 to transmit the connection request with the identical wireless settings for a predetermined number of times. If the flow in S702-704 is repeated for the predetermined number of times, but result indicating successful establishment of connection is not received, the control unit 210 terminates Process #2. If result indicating successful establishment of connection is received within the predetermined number of times of attempts, it is determined that the attempt is successful.

In S700, when the character count of the password is other than zero (S700: NO), in S708, the control unit 210 examines as to whether the wireless network represented by the SSID, which was obtained in S506, operates in the infrastructure mode. In this step, the control unit 210 specifically examines information appended to the SSID, which was obtained by the control unit 110 of the MFP 100 from the external device in S602 through the wireless interface 120. The appended information indicates the communication mode of the wireless network, which is one of the infrastructure mode and the ad-hoc mode. The appended information is passed to the PC 200 along with the SSID when the search result is transmitted to the PC 200 in S602. Therefore, the control unit 210 refers to the appended information in order to determine the communication mode of the wireless network represented by the SSID obtained in S506. When the control unit 210 determines that the communication mode is the ad-hoc mode (S708: NO), the flow proceeds to S710. In S710, the control unit 210 examines as to whether the character count of the password is any of 5, 10, 13, and 26. If the character count is none of 5, 10, 13, or 26 (S710: NO), the control unit 210 terminates Process #2. When the character count is any of 5, 10, 13, and 26 (S710: YES), the flow proceeds to S746 (FIG. 10).

In S712, the control unit 210 examines as to whether the character count of the password, which was obtained in S510, is greater than or equal to 8, or smaller than or equal to 63. Methods to examine the character counts in S710 and S712 are identical with S208 and S210 in the wireless settings installation process according to the first embodiment and shown in FIG. 5; therefore, description of those is omitted.

In S712, if the control unit 210 determines that the character count of the password is not greater than or equal to 8, or smaller than or equal to 63 (S712: NO), the flow proceeds to S738 (FIG. 10). If the control unit 210 determines that the character count of the password is greater than or equal to 8, or smaller than or equal to 63 (S712: YES), in S714, the control unit 210 adopts the set: "WPA2 and AES" for the authorization method and the encryption method to be the wireless settings, in which the control unit 110 of the MFP 100 will attempt to establish connection with the external device. Further, the control unit 210 transmits a connection request to the MFP 100 through the USB interface 250 so that the MFP 100 will attempt to establish connection with the external device according to the wireless settings: i.e., the authorization method being WPA2, the encryption method being AES, the SSID obtained in S506, and the password obtained in S510. Thereafter, in S716, the control unit 210 transmits a request for result of the attempt to the MFP 100 and receives the result. In S718, it is examined as to whether the connection is established. When the result indicates failure of the attempt (S718: NO), in S720, the control unit 210 adopts the next set of the authorization method and the encryption method: "WPA2 and TKIP." Further, the control unit 210 transmits a connection request to the MFP 100 to attempt establishing connection with the external device according to the wireless settings (i.e., the authorization method being WPA2, the encryption method being TKIP, the SSID obtained in S506, and the password obtained in S510). Thereafter, in S722, the control unit 210 transmits a request for result of the attempt to the MFP 100 and receives the result. In S724, it is examined as to whether the connection is established. When the result indicates failure of the attempt (S724: NO), in S726, the control unit 210 adopts the next set of the authorization method and the encryption method: "WPA and AES." Further, the control unit 210 transmits a connection request to the MFP 100 to attempt establishing connection with the external device according to the wireless settings (i.e., the authorization method being WPA, the encryption method being AES, the SSID obtained in S506, and the password obtained in S510). Thereafter, in S728, the control unit 210 transmits a request for result of the attempt to the MFP 100 and receives the result. In S730, it is examined as to whether the connection is established. When the result indicates failure of the attempt (S730: NO), in S732, the control unit 210 adopts the next set of the authorization method and the encryption method: "WPA and TKIP." Further, the control unit 210 transmits a connection request to the MFP 100 to attempt establishing connection with the external device according to the wireless settings (i.e., the authorization method being WPA, the encryption method being TKIP, the SSID obtained in S506, and the password obtained in S510). Thereafter, in S734, the control unit 210 transmits a request for result of the attempt to the MFP 100 and receives the result.

In S736, it is examined as to whether the connection is established. When the result indicates failure of the attempt (S736: NO), in S738 (FIG. 11), the control unit 210 examines as to whether the character count of the password is any of 5, 10, 13, and 26. If the character count is none of 5, 10, 13, or 26 (S738: NO), the control unit 210 terminates Process #2. When the character count is any of 5, 10, 13, and 26 (S738: YES), the flow proceeds to S740. In S740, the control unit 210 adopts the next set of the authorization method and the encryption method: "Shared-key and WEP." Further, the control unit 210 transmits a connection request to the MFP 100 to attempt establishing connection with the external device according to the wireless settings (i.e., the authorization method being Shared-key, the encryption method being WEP, the SSID obtained in S506, and the password obtained in S510). Thereafter, in S742, the control unit 210 transmits a request for result of the attempt to the MFP 100 and receives the result. In S744, it is examined as to whether the connection is established. When the result indicates failure of the attempt (S744: NO), in S746, the control unit 210 adopts the next set of the authorization method and the encryption method: "open and WEP." Further, the control unit 210 transmits a connection request to the MFP 100 to attempt establishing connection with the external device according to the wireless settings (i.e., the authorization method being open, the encryption method being WEP, the SSID obtained in S506, and the password obtained in S510). Thereafter, in S748, the control unit 210 transmits a request for result of the attempt to the MFP 100 and receives the result. The flow in Process #2 ends thereafter. Meanwhile, in any of S718, S724, S730, S736, and S744, if the result of attempt to establish connection with the external device indicates successful establishment of connection (S718: YES, S724: YES, S730: YES, S736: YES, or S744: YES), Process #2 in S512 (FIG. 8) ends and proceeds to S514.

In S748, if the result of attempt to establish connection indicates failure of the attempt, the control unit 210 repeats S714 and the succeeding steps in the background operation. In this regard, the control unit 210 carries out S514 to present a message indicating the failure of the attempt to the user through the display unit 240. When connection with the external device is established (S718: YES, S724: YES, S730: YES, S736: YES, or S744: YES) or the result of attempt in S748 indicates successful establishment of connection whilst the flow in S714-S748 is repeated in the background operation, in S514, the control unit 210 present a message indicating successful establishment of the connection to the user through the display unit 240. In the above embodiment, the connection request at least includes the set of the authorization method and the encryption method, and the password. In this regard, the connection request may include the SSID. However, the SSID may not necessarily be included in the connection request. When the SSID is not included, similarly to the connection request described in the second embodiment, the connection request includes identifying information which identifies the SSID.

Next, detailed behavior of the control unit 110 of the MFP 100 in S604 will be described with reference to FIG. 11. The flow of behaviors in S604 will be also referred to as Process #3. When the flow starts, in S800, the control unit 110 of the MFP 100 receives and obtains the connection request, which is transmitted from the PC 200 in one of S714, S712, S726, S732, S740, and S746, through the USB interface 180. In S802, the control unit 110 attempts to establish connection with the external device in the wireless network according to the wireless settings (i.e., the authorization method and the encryption method obtained in S800, the SSID obtained in S506, and the password obtained in S510). In S804, the control unit 110 obtains result of the attempt. The control unit 110 determines the result of the attempt based on, for example, data transmitted from the external device. When no response is transmitted from the external device within a predetermined length of period, the control unit 110 may determine that the attempt failed. When the connection is established, the control unit 110 reserves the wireless settings used in the attempt in the storage unit 130.

In S805, the control unit 110 manipulates the USB interface 180 to receive the request for the result of the attempt, which is transmitted from the PC 200 in one of S704, S716, S722, S728, S734 (FIG. 9), S742, and S748 (FIG. 10). In S806, the control unit 110 transmits the result of the attempt to the PC 200. Process #3 ends thereafter.

According to the above embodiment, specifically, the PC 200 connected to the MFP 100 via the USB interfaces 180, 250 adopts the set of the authorization method and the encryption method to be attempted for connection establishment. Thus, the connection request, which requests for establishment of connection in the wireless settings of the adopted set including the authorization method and the encryption method, is passed to the MFP 100 (S512 and S604). The MFP 100 is required to attempt establishing connection according to the ready-adopted wireless settings; therefore, the MFP 100 is released from the workload to select the wireless settings for the attempts.

Although examples of carrying out the invention has been described, those skilled in the art will appreciate that there are numerous variations and permutations of the wireless communication device, the method and the computer usable medium to store computer readable instructions to connect the wireless communication device that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above embodiments, the sets of the authorization method and the encryption method are attempted in the order of "WPA2 and AES," "WPA2 and TKIP," "WPA and AES," "WPA and TKIP," "Shared-key and WEP," and "open and WEP." In this order, the authorization method and the encryption method are adopted sequentially on the basis of the authorization method rather than the encryption method. In particular, a set having an encryption method with security of a higher level is adopted earlier than a set having an encryption method with security of a lower level between the sets having the same authorization method. For example, between "WPA2 and AES" and "WPA" and TKIP", the set "WPA2 and AES" is adopted preferentially over the set "WPA" and TKIP."

However, the set may be adopted on the basis of the encryption method rather than the authorization method. For example, the sets may be adopted in the order of "WPA2 and AES," "WPA and AES," "WPA2 and TKIP," and "WPA and TKIP." In this order, a set having an authorization method with higher-leveled security is adopted earlier than a set having an authorization method with lower-leveled security between the sets having the same encryption method. For example, between "WPA2 and AES" and "WPA" and AES", the set "WPA2 and AES" is adopted preferentially over the set "WPA" and AES."

The order may be therefore determined based on preferences. However, for example, when an access point is capable of operating in a plurality of sets of authorization methods and encryption methods, the access point is generally configured to establish communication according to the set of wireless settings with higher-leveled security. Therefore, if the attempts to establish connection with the access point in the order of security levels (i.e., higher to lower), it is likely that the connection is established earlier compared to attempts to establish connection in the reverse order.

In the above embodiments, the sets of authorization method and encryption method "WPA2 and AES," "WPA2 and TKIP," "WPA and AES," and "WPA and TKIP" are adopted in the order given when the character count of the obtained password is in the range from 8 to 63. Further, the sets "Shared-key and WEP" and "open and WEP" are adopted when the character count of the password is any of 5, 10, 13, and 26. Alternatively, the steps S210 and S228 may be omitted. In this regard, when the character count of the password is greater than zero, the sets "WPA2 and AES," "WPA2 and TKIP," "WPA and AES," "WPA and TKIP," "Shared-key and WEP," and "open and WEP" can be sequentially adopted to be the wireless settings in which the MFP 100 should attempt to establish connection with the external device.

What is claimed is:

1. A wireless communication device, comprising:
a processor;
a memory storing computer readable instructions that, when executed, cause the wireless communication device to perform steps of:
obtaining a password designated by a user for connecting the wireless communication device to a wireless network; and
connecting the wireless communication device to the wireless network using the obtained password,
wherein the connecting step comprises selecting one set from two or more sets, and
sequentially attempting to connect the wireless communication device to the wireless network using the sequentially selected one set,
wherein the two or more sets include:
a first set having an authorization method and a first encryption method; and
a second set having the authorization method and a second encryption method with its security level being lower than the first encryption method; and
wherein the connecting step selects the first set prior to the second set.

2. A wireless communication device comprising
a processor;
a memory storing computer readable instructions that, when executed, cause the wireless communication device to perform steps of:
obtaining a password designated by a user for connecting the wireless communication device to a wireless network; and
connecting the wireless communication device to the wireless network using the obtained password,
wherein the connecting step comprises
selecting one set from two or more sets, and
sequentially attempting to connect the wireless communication device to the wireless network using the sequentially selected one set,
wherein the two or more sets include:
a first set having a first authorization method and an encryption method; and
a second set having a second authorization method with its security level being lower than the first authorization method and the encryption method,
wherein the connecting step selects the first set prior to the second set.

3. A wireless communication device comprising:
a processor;
a memory storing computer readable instructions that, when executed, cause the wireless communication device to perform steps of:
obtaining a password designated by a user for connecting the wireless communication device to a wireless network; and
connecting the wireless communication device to the wireless network using the obtained password,
wherein the connecting step comprises
selecting one set from two or more sets, and
sequentially attempting to connect the wireless communication device to the wireless network using the sequentially selected one set, each set of the two or more sets having an authorization method and an encryption method,
determining a character count of the obtained password; and
if the character count of the password is determined to be a predetermined number, selecting the two or more sets among a plurality of sets, wherein the two or more sets do not include a predetermined set included in the plurality of sets.

4. A wireless communication device comprising:
a processor;
a memory storing computer readable instructions that, when executed, cause the wireless communication device to perform steps of:
  obtaining a password designated by a user for connecting the wireless communication device to a wireless network; and
  connecting the wireless communication device to the wireless network using the obtained password,
  wherein the connecting step comprises
    selecting one set from two or more sets,
    sequentially attempting to connect the wireless communication device to the wireless network using the sequentially selected one set, each set of the two or more sets having an authorization method and an encryption method,
    determining a character count of the obtained password;
    if the character count of the password is determined to be zero, selecting a specified set having open authorization as the authorization method and no encryption as the encryption method and attempting to connect the wireless communication device to the wireless network using the specified set; and
    if the character count of the password is determined to be other than zero, selecting the two or more sets in turn.

5. The wireless communication device according to claim 4, wherein the two or more sets include:
  a first set having an authorization method and a first encryption method; and
  a second set having the authorization method and a second encryption method with its security level being lower than the first encryption method; and
  wherein the connecting step selects the first set prior to the second set.

6. The wireless communication device according to claim 4, wherein the computer readable instructions, when executed, further perform a step of:
  obtaining a network identifier designated by the user, the network identifier identifying the wireless network,
  wherein the connecting step connects the wireless communication device to the wireless network identified by the network identifier.

7. The wireless communication device according to claim 4, wherein the step of obtaining the password obtains the password designated by the user regardless of whether a password is utilized in the wireless network.

8. The wireless communication device according to claim 4, wherein the two or more sets include:
  a first set having a first authorization method and an encryption method; and
  a second set having a second authorization method with its security level being lower than the first authorization method and the encryption method,
  wherein the connecting step selects the first set prior to the second set.

9. The wireless communication device according to claim 4, wherein the connecting step comprises
  determining a character count of the obtained password; and
  if the character count of the password is determined to be a predetermined number, selecting the two or more sets among a plurality of sets, wherein the two or more sets do not include a predetermined set included in the plurality of sets.

10. A non-transitory computer readable medium comprising computer readable instructions that, when executed, control a wireless communication device to be connected to a wireless network by performing steps of:
  obtaining a password designated by a user for connecting the wireless communication device to the wireless network; and
  connecting the wireless communication device to the wireless network using the obtained password,
  wherein one set from two or more sets is sequentially selected, and connection of the wireless communication device to the wireless network using the sequentially selected one set is sequentially attempted in the step of connecting,
  wherein the two or more sets include:
    a first set having an authorization method and a first encryption method; and
    a second set having the authorization method and a second encryption method with its security level being lower than the first encryption method; and
  wherein the connecting step selects the first set prior to the second set.

11. A non-transitory computer readable medium comprising computer readable instructions that, when executed, control a wireless communication device to be connected to a wireless network by performing steps of:
  obtaining a password designated by a user for connecting the wireless communication device to the wireless network; and
  connecting the wireless communication device to the wireless network using the obtained password,
  wherein one set from two or more sets is sequentially selected, and connection of the wireless communication device to the wireless network using the sequentially selected one set is sequentially attempted in the step of connecting,
  wherein the two or more sets include:
    a first set having a first authorization method and an encryption method; and
    a second set having a second authorization method with its security level being lower than the first authorization method and the encryption method,
  wherein the connecting step selects the first set prior to the second set.

12. A non-transitory computer readable medium comprising computer readable instructions that, when executed, control a wireless communication device to be connected to a wireless network by performing steps of:
  obtaining a password designated by a user for connecting the wireless communication device to the wireless network; and
  connecting the wireless communication device to the wireless network using the obtained password,
  wherein one set from two or more sets is sequentially selected, each set of the two or more sets having an authorization method and an encryption method, and connection of the wireless communication device to the wireless network using the sequentially selected one set is sequentially attempted in the step of connecting,
  wherein the connecting step comprises
    determining a character count of the obtained password; and
    if the character count of the password is determined to be a predetermined number, selecting the two or more sets among a plurality of sets, wherein the two or more sets do not include a predetermined set included in the plurality of sets.

13. A non-transitory computer readable medium comprising computer readable instructions that, when executed, control a wireless communication device to be connected to a wireless network by performing steps of:
- obtaining a password designated by a user for connecting the wireless communication device to the wireless network; and
- connecting the wireless communication device to the wireless network using the obtained password,
- wherein one set from two or more sets is sequentially selected, each set of the two or more sets having an authorization method and an encryption method, and connection of the wireless communication device to the wireless network using the sequentially selected one set is sequentially attempted in the step of connecting,
- wherein the connecting step comprises
  - determining a character count of the obtained password;
  - if the character count of the password is determined to be zero, selecting a specified set having open authorization as the authorization method and no encryption as the encryption method and attempting to connect the wireless communication device to the wireless network using the specified set; and
  - if the character count of the password is determined to be other than zero, selecting the two or more sets in turn.

14. The non-transitory computer readable medium according to claim 13, wherein the two or more sets include:
- a first set having an authorization method and a first encryption method; and
- a second set having the authorization method and a second encryption method with its security level being lower than the first encryption method; and
- wherein the connecting step selects the first set prior to the second set.

15. The non-transitory computer readable medium according to claim 13, wherein the two or more sets include:
- a first set having a first authorization method and an encryption method; and
- a second set having a second authorization method with its security level being lower than the first authorization method and the encryption method,
- wherein the connecting step selects the first set prior to the second set.

16. The non-transitory computer readable medium according to claim 13, wherein the connecting step comprises:
- determining a character count of the obtained password; and
- if the character count of the password is determined to be a predetermined number, selecting the two or more sets among a plurality of sets, wherein the two or more sets do not include a predetermined set included in the plurality of sets.

17. The non-transitory computer readable medium according to claim 13, wherein the computer readable instructions, when executed, further perform a step of:
- obtaining a network identifier designated by the user, the network identifier identifying the wireless network,
- wherein the connecting step connects the wireless communication device to the wireless network identified by the network identifier.

18. The non-transitory computer readable medium according to claim 13, wherein the step of obtaining the password obtains the password designated by the user regardless of whether a password is utilized in the wireless network.

* * * * *

UNITED STATES PATENT AND TRADEMARK OFFICE
CERTIFICATE OF CORRECTION

| | | |
|---|---|---|
| PATENT NO. | : 8,351,607 B2 | Page 1 of 1 |
| APPLICATION NO. | : 12/565202 | |
| DATED | : January 8, 2013 | |
| INVENTOR(S) | : Satoko Ando et al. | |

It is certified that error appears in the above-identified patent and that said Letters Patent is hereby corrected as shown below:

In the Claims

Column 16, Claim 3, Line 63:
    Please delete "the password" and insert -- the obtained password --.

Column 17, Claim 4, Line 20:
    Please delete "the password" and insert -- the obtained password --.

Column 17, Claim 4, Line 26:
    Please delete "the password" and insert -- the obtained password --.

Column 17, Claim 6, Line 40:
    Please delete "executed, further" and insert -- executed, cause the wireless communication device to further --.

Column 17, Claim 9, Line 63:
    Please delete "the password" and insert -- the obtained password --.

Column 18, Claim 12, Line 63:
    Please delete "the password" and insert -- the obtained password --.

Column 19, Claim 13, Line 19:
    Please delete "the password" and insert -- the obtained password --.

Column 19, Claim 13, Line 25:
    Please delete "the password" and insert -- the obtained password --.

Column 20, Claim 16, Line 16:
    Please delete "the password" and insert -- the obtained password --.

Signed and Sealed this
Eleventh Day of February, 2014

Michelle K. Lee
*Deputy Director of the United States Patent and Trademark Office*